United States Patent
Svejnoha et al.

(10) Patent No.: US 10,379,549 B2
(45) Date of Patent: Aug. 13, 2019

(54) PRESSURE INDEPENDENT CONTROL VALVE

(71) Applicant: Honeywell Technologies Sarl, Rolle (CH)

(72) Inventors: Petr Svejnoha, Vyskov (CZ); Petr Fadrny, Blanska (CZ); Martin Klepsa, Brno (CZ)

(73) Assignee: Honeywell Technologies Sarl, Rolle (CH)

( * ) Notice: Subject to any disclaimer, the term of this patent is extended or adjusted under 35 U.S.C. 154(b) by 0 days.

(21) Appl. No.: 15/728,269

(22) Filed: Oct. 9, 2017

(65) Prior Publication Data

US 2018/0107231 A1    Apr. 19, 2018

(30) Foreign Application Priority Data

Oct. 14, 2016    (EP) .................................... 16193993

(51) Int. Cl.
| | |
|---|---|
| *F16K 7/17* | (2006.01) |
| *G05D 7/01* | (2006.01) |
| *G05D 16/08* | (2006.01) |
| *F16K 31/126* | (2006.01) |

(52) U.S. Cl.
CPC ............... *G05D 16/08* (2013.01); *F16K 7/17* (2013.01); *F16K 31/1262* (2013.01); *G05D 7/0106* (2013.01)

(58) Field of Classification Search
CPC ....... F16K 31/1262; F16K 7/17; G05D 16/08; G05D 7/0106
See application file for complete search history.

(56) References Cited

U.S. PATENT DOCUMENTS

| | | | |
|---|---|---|---|
| 5,586,569 A  * | 12/1996 | Hanning | ............ G05D 16/0663 |
| | | | 137/116.5 |
| 5,860,591 A  * | 1/1999 | Gylov | .................. G05D 23/125 |
| | | | 236/42 |
| 6,827,100 B1 | 12/2004 | Carlson | |

(Continued)

FOREIGN PATENT DOCUMENTS

| | | |
|---|---|---|
| DE | 102014004910 A1 | 9/2015 |
| EP | 1025473 B1 | 12/2001 |

(Continued)

OTHER PUBLICATIONS

The Extended European Search Report and European Search Opinion, dated May 23, 2017.

(Continued)

*Primary Examiner* — William M McCalister
(74) *Attorney, Agent, or Firm* — Shumaker & Sieffert, P.A.

(57) ABSTRACT

A pressure independent control valve (10) for controlling the flow of a liquid medium includes a valve body having a side wall defining a conduit that extends from an inlet to an outlet. The side wall of the valve body include a first side opening (23) and a second side opening (24) extending into the conduit. A first insert element (21) is placed into the first side opening (23) and a second insert element (22) is placed into the second side opening (24). At least part of a pressure control device (18) is accommodated by said first insert element (21), and at least part of a flow rate adjustment device (19) is accommodated by said second insert element (22).

19 Claims, 7 Drawing Sheets

(56) References Cited

U.S. PATENT DOCUMENTS

| | | | |
|---|---|---|---|
| 7,967,023 B2* | 6/2011 | Jorgensen | F24D 19/1015 137/201 |
| 2007/0262279 A1* | 11/2007 | Marstorp | F16K 1/526 251/118 |
| 2010/0170581 A1* | 7/2010 | Loeffler | G05D 7/005 137/455 |
| 2012/0241033 A1 | 9/2012 | Clifford et al. | |
| 2016/0139605 A1 | 5/2016 | Guidetti et al. | |

FOREIGN PATENT DOCUMENTS

| | | |
|---|---|---|
| EP | 3059651 A1 | 8/2016 |
| EP | 2898387 B1 | 10/2016 |
| WO | 2014089443 A1 | 6/2014 |

OTHER PUBLICATIONS

Honeywell, "Pressure Independent Control Valve, Quick Selection Guide," 16 pages, Sep. 2014.

Response to Extended Search Report dated Apr. 23, 2018, from counterpart European Application No. 161933993.9, filed Oct. 16, 2018, 18 pp.

\* cited by examiner

PRESSURE INDEPENDENT CONTROL VALVE

This application claims priority to European Patent Application No. 16 193 993.9, filed Oct. 14, 2016 and entitled, "PRESSURE INDEPENDENT CONTROL VALVE," which is incorporated herein by reference.

TECHNICAL FIELD

The present patent application relates to a pressure independent control valve.

BACKGROUND

When conventional two-way valves in multi-zone, heating and cooling systems open or close, a pressure change resulting in overflow or underflow is caused. Pressure independent control valves maintain the required flow rate constant by regulating the pressure drop. The product leaflet "Pressure Independent Control Valve, Quick Selection Guide, 67-7258 PR, September 2014, Honeywell International Inc." discloses the basic concept of such pressure independent control valves (PICV).

EP 3 059 651 A1 discloses a pressure independent control valve for controlling the flow of a liquid medium in heating and cooling systems. This pressure independent control valve comprises a valve body, a first functional group and a second functional group. The valve body provides an inlet section in which an inlet pressure of the liquid medium is present, an outlet section in which an outlet pressure of the liquid medium is present, wherein the outlet section is coaxial with the inlet section, and a middle section positioned between the inlet section and the outlet section, wherein an upstream chamber and a downstream chamber being in communication with each other through an adjustment orifice are provided with the middle section. The first functional group is defined by a control device for controlling a differential pressure between upstream of the adjustment orifice, in correspondence with the upstream chamber, and downstream of the adjustment orifice, in correspondence with the downstream chamber. The second functional group defined by an adjustment device is suitable for increasing and/or decreasing the liquid flow through the adjustment orifice.

The adjustment orifice of the pressure independent control valve disclosed by EP 3 059 651 A1 is provided by the valve body, namely by a central section of the same being inclined with respect to the inlet section and outlet section. The first functional group and the second functional group are accommodated by said inclined central section. The second functional group is a functional group tailored to a required flow rate. Flow modifications are realized by different second functional groups. This requires many extra components being produced for special purpose of usage in pressure independent control valves only.

SUMMARY

Against this background, a novel pressure independent control valve according to claim 1 is provided.

According to the present invention, the pressure independent control valve comprises a first insert element and a second insert element. The first insert element provides the adjustment orifice and is positioned at least partially within the middle section of the valve body. Also the second insert element is positioned at least partially within the middle section of the valve body. Said first insert element is placed at least partially within the middle section of the valve body through a first opening of the valve body provided at a first side of the middle section. Said second insert element is placed at least partially within the middle section of the valve body through a second opening of the valve body provided at a second, opposite side of the middle section. The first functional group is at least partially accommodated with said first insert element. The second functional group is at least partially accommodated with said second insert element.

With the invention it is possible to reduce the production costs and to use components which are produced in much higher volumes. Specifically, the invention allows the use of thermostatic radiator valve (TRV) inserts as second functional groups of a pressure independent control valves (PICV).

Flow modifications can be realized via different standard thermostatic radiator valve inserts to be screwed into the second insert element acting as interface with the respective thermostatic radiator valve.

Flow modifications can be done e.g. by pre-setting of the thermostatic radiator valve inserts themselves or by operating an external hand-wheel or by using an actuator.

According to a preferred embodiment of the invention, the first insert element is coaxial with the second insert element. The first opening of the valve body is coaxial with the second opening of the valve body. A longitudinal axis of the first insert element and a longitudinal axis of the second insert element, as well as a longitudinal axis of the first opening of the valve body and a longitudinal axis of the second opening of the valve body run all perpendicular to a longitudinal axis of the inlet section and a longitudinal axis of the outlet section of the valve body. This ensures a very beneficial operation of the pressure independent control valve.

According to a preferred embodiment of the invention, an inner wall section of the first insert element that provides the adjustment orifice comprises ribs. Preferably, the ribs are inclined relative to a longitudinal axis of the adjustment orifice. The axis of the ribs and the the longitudinal axis of the adjustment orifice define or confine an angle between 5° and 60°, preferably between 10° and 50°, most preferably between 15° and 40°. This allows the elimination of hysteresis of the pressure independent control valve.

According to a preferred embodiment of the invention, an outer wall section of the first insert element provides a groove accommodating a sealing element, wherein said groove is running diagonally around said outer wall section so that the sealing element accommodated within said groove seals the upstream chamber against the downstream chamber. This ensures a very beneficial operation of the pressure independent control valve.

According to a preferred embodiment of the invention, an outer wall section of the first insert element comprises at least one inlet opening through which the liquid medium can flow from the inlet section of the valve body into the upstream chamber of the middle section. Said outer wall section of the first insert element further comprises at least one outlet opening through which the liquid medium can flow from the downstream chamber of the middle section into the outlet section of the valve body. Preferably, the outer wall section of the first insert element comprises multiple inlet openings. Each inlet opening may have a different cross section, wherein each of said inlet openings is in communication with the inlet section of the valve body. The outer wall section of the first insert element may also comprise multiple outlet openings with different cross sections. The second insert element provides an inlet opening being in communication with the adjustment orifice. The second insert element provides further an outlet opening being in communication with the or each outlet opening of the first insert element. The relative position of the outlet opening of the second insert element relative to the or each outlet opening of the first insert element defines the presetting of the maximum flow through the pressure independent control valve. This ensures a very beneficial operation of the pressure independent control valve and an easy and reliable presetting of the same.

BRIEF DESCRIPTION OF THE DRAWINGS

Preferred developments of the invention are provided by the dependent claims and the description which follows. Exemplary embodiments are explained in more detail on the basis of the drawing, in which:

DESCRIPTION

Figure 1:
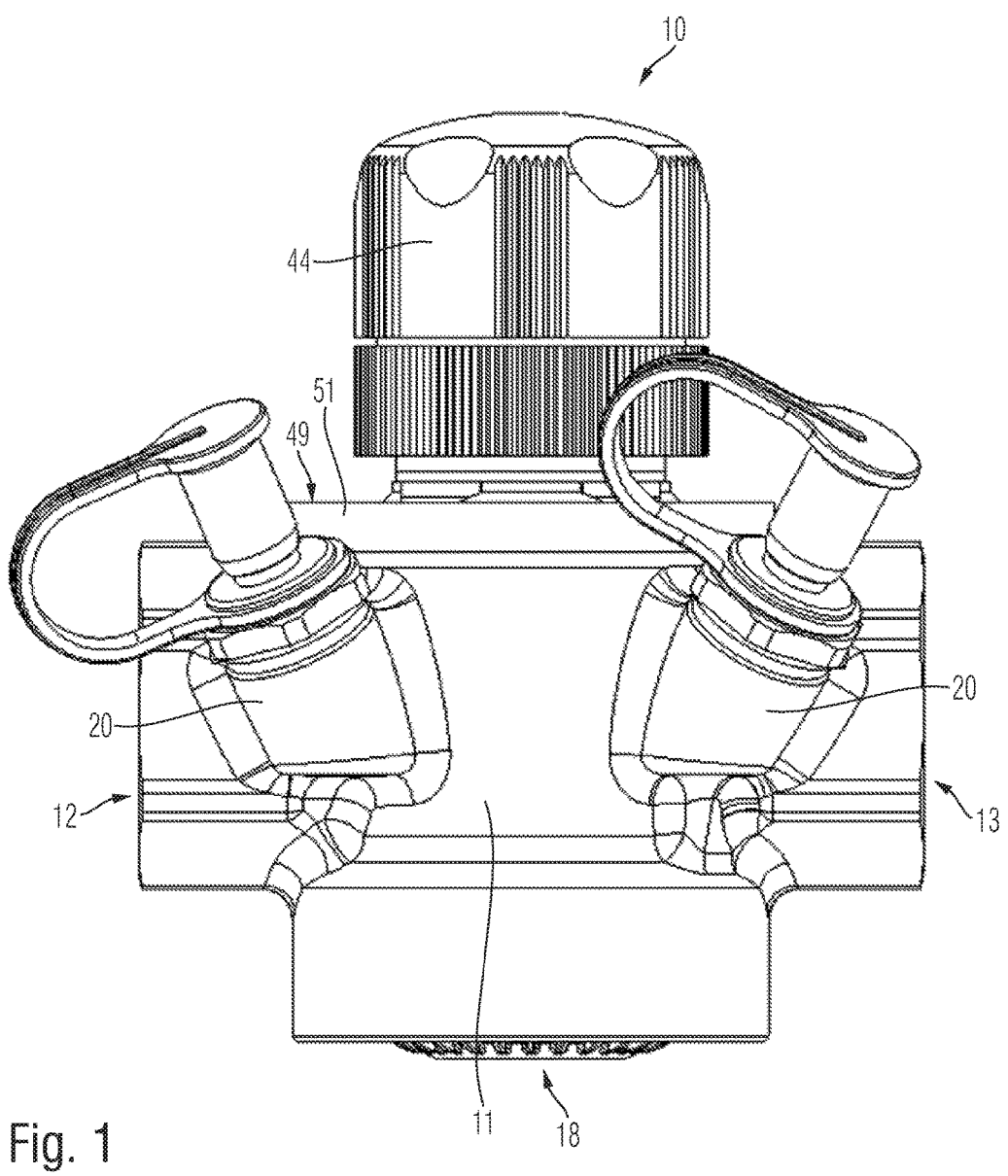
FIG. 1 shows a side view of a pressure independent control valve.

The present invention provides a pressure independent control valve 10. Such a pressure independent control valve 10 is also often called PICV. The pressure independent control valve 10 is used to control the flow of a liquid medium in heating and cooling systems.

The pressure independent control valve 10 comprises a valve body 11. The valve body 11 may be provided by a tubular element.

The valve body 11 provides an inlet section 12, an outlet section 13 and a middle section 14. Within the inlet section 12 an inlet pressure of the liquid medium is present. Within the outlet section 13 an outlet pressure of the liquid medium is present. The inlet section 12 and the outlet section 13 are coaxial with each other. So, a longitudinal axis 12a of the inlet section 12 is coaxially aligned with a longitudinal axis 13a of the outlet section 13. These longitudinal axes 12a, 13a correspond to the flow direction of the liquid medium through inlet section 12 and the outlet section 13.

The middle section 14 is positioned between the inlet section 12 and the outlet section 13. A longitudinal axis 14a of the middle section 14 runs perpendicular to the longitudinal axis 12a of the inlet section 12 and to the longitudinal axis 13a of the outlet section 13.

An upstream chamber 15 and a downstream chamber 16 being in communication with each other through an adjustment orifice 17 are provided within the middle section 14.

The upstream chamber 15 is further in communication with the inlet section 12. The downstream chamber 16 is further in communication with the outlet section 13.

The pressure independent control valve 10 comprises a first functional group defined by a control device 18 for controlling a differential pressure. The first functional group or control device 18 controls the differential pressure between the pressure upstream of the adjustment orifice 17, namely the pressure within the upstream chamber 15, and the outlet pressure being present within the outlet section 13.

The pressure independent control valve 10 further comprises a second functional group defined by an adjustment device 19 suitable for increasing and/or decreasing the liquid flow through the adjustment orifice 17.

As shown in FIG. 1, the pressure independent control valve 10 may further comprise check sections 20 for measuring pressures within the inlet section 12 and within the outlet section 13. These check sections 20 may accommodate pressure sensors or pressure test cocks for measuring said pressures.

The pressure independent control valve 10 further comprises a first insert element 21 and a second insert element 22. These insert elements 21, 22 are both monolithic. The insert elements 21, 22 are monolithic themselves but not monolithic with the valve body 11. The first insert element 21 provides the adjustment orifice 17.

The first insert element 21 is positioned at least partially, preferably completely, within the middle section 14 of the valve body 11. Said first insert element 21 is placed within the middle section 14 of the valve body 11 through a first opening 23 of the valve body 11 provided at a first side of the middle section 14. The first functional group 18 is at least partially accommodated with said first insert element 21.

The second insert element 22 is at least partially positioned within the middle section 14 of the valve body 11. Said second insert element 22 is placed within the middle section 14 of the valve body 11 through a second opening 24 of the valve body 11 provided at a second, opposite side of the middle section 14. The second functional group 19 is at least partially accommodated with said second insert element 22.

The first insert element 21 is coaxial with the second insert element 22. The first opening 23 of the valve body 11 accommodating said first insert element 21 is coaxial with the second opening 24 of the valve body 11 accommodating said second insert element 22. So, the first functional group 18 accommodated by the first insert element 21 is coaxial with the second functional group 19 accommodated by the second insert element 22.

A longitudinal axis 21a of the first insert element 21, a longitudinal axis 22a of the second insert element 22, a longitudinal axis 23a of the first opening 23, and a longitudinal axis 24a of the second opening 24 run all perpendicular to the longitudinal axis 12a of the inlet section 12 of the valve body 11 and to the longitudinal axis 13a of the outlet section 13 of the valve body 11.

So, both functional groups run perpendicular to the longitudinal axis 12a of the inlet section 12 and the longitudinal axis 13a outlet section 13 of the valve body 11.

The longitudinal axis 17a of the adjustment orifice 17 runs perpendicular to the longitudinal axis 12a of the inlet section 12 of the valve body 11 and perpendicular to the longitudinal axis 13a of the outlet section 13 of the valve body 11. The longitudinal axis 17a of the adjustment orifice 17 corresponds to the flow direction of the liquid medium from the upstream chamber 15 into the downstream chamber 16 through the adjustment orifice 17.

As mentioned above, the first functional group being defined by the control device 18 controls the differential pressure between the pressure within the upstream chamber 15 and the outlet pressure within the outlet section 13. Said control device 18 comprises a housing 25 having an outer thread 26 engaging an inner thread 27 of the first insert element 21, a mobile element 28, a diaphragm 30, disk-like elements 29a and 29b for positioning the diaphragm 30, a spring element 31 acting against the housing 25 and the disk-like element 29a and 29b, and a lid or cover 32. The function of said control device 18 is known to the person skilled in the art and does not need to be further described.

An inner wall section 33 of the first insert element 21 provides the adjustment orifice 17. On a first side of said adjustment orifice 17 the upstream chamber 15 is provided. At an opposite second side of said adjustment orifice 17 the downstream chamber 16 is provided.

An outer wall section 34 of the first insert element 21 is divided by the inner wall section 33 into two subsections 34a and 34b, wherein the subsection 34a defines partially the upstream chamber 15 and wherein the subsection 34b defines partially the downstream chamber 16. The outer wall section 34 is of cylindrical shape. A longitudinal axis of the same runs parallel to the longitudinal axis 14a of the middle section 14. An inner wall section 33 of the first insert element 21 is positioned inside the outer wall section 34 of the first insert element 21 and runs perpendicular to the longitudinal axis 14a of the middle section 14.

The outer wall section 34, namely the subsection 34a, of the first insert element 21 comprises at least one inlet opening 35, preferably multiple inlet openings 35 which may have different cross sections. In the latter case, each of said inlet openings 35 is in communication with the inlet section 12 of the valve body 11. Further on, the outer wall section 34, namely the subsection 34b, of the first insert element 21 comprises at least one outlet opening 36. The same may comprise multiple outlet openings 36 which may have different cross sections.

The relative position of the first insert element 21 within the middle section 14 of the valve body 11 is defined and fixed by a pin 53 of the first insert element 21 which projects into a recess 54 of the valve body 11.

The outer wall section 34 of the first insert 21 provides a groove 37 accommodating a sealing element 38, wherein said groove 37 is running diagonally around said outer wall section 34 of the first insert 21 so that the sealing element 38 accommodated within said groove 37 seals the upstream chamber 15 against the downstream chamber 16.

The inner wall section 33 of the first insert 21 that defines the adjustment orifice 17 comprises ribs 39. Said ribs 39 are provided at a flow guiding surface of the adjustment orifice 17. The ribs 39 are inclined relative to the longitudinal axis 17a of the adjustment orifice 17. The longitudinal axis 17a of the adjustment orifice 17 corresponds to the flow direction of the liquid medium through the adjustment orifice 17. The axis of the ribs 39 and the longitudinal axis 17a of the adjustment orifice 17 define an angle between 5° and 60°, preferably between 10° and 50°, most preferably between 15° and 40°.

Said adjustment device 19 is provided by a thermostatic radiator valve insert. The thermostatic radiator valve insert comprises a valve stem 40 carrying a valve plunger 41, a guiding element 42 for the valve stem 40 and a spring elements 43a, 43b acting on the valve stem 40 and the guiding element 42. The function of such a thermostatic radiator valve insert is known to the person skilled in the art and does not need to be further described.

Said adjustment device 19 being provided by the thermostatic radiator valve insert is at least partially accommodated within the second insert 22. The guiding element 42 of the adjustment device 19 has an outer thread 45 acting together with an inner thread 46 of the second insert element 22.

The second insert element 22 provides an inlet opening 47 being coaxial and in communication with the adjustment orifice 17. The liquid medium flows from the upstream chamber 15 into the downstream chamber 16 through the adjustment orifice 17 and inlet opening 47 of the second insert element 22.

Figure 8:
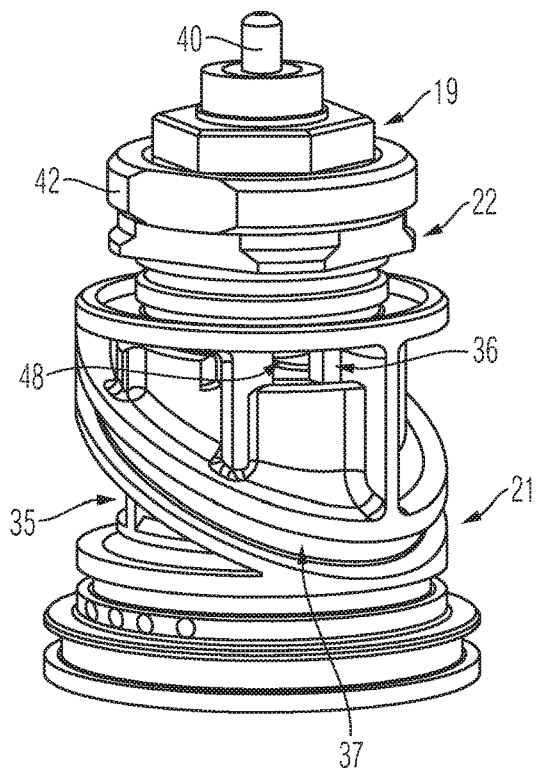
FIG. 8 shows an assembly of the a detail shown in FIGS. 5 and 6.

The second insert element 22 further has an outlet opening 48. The outlet opening 48 of the second insert element 22 is provided outer wall section of the same. The outlet opening 48 of the second insert element 22 in communication with the or each outlet opening 36 of the first insert element 21. See FIGS. 8 and 9. The liquid medium flows from the downstream chamber 16 into the outlet section 13 through the outlet opening 48 of the second insert element 22 and the outlet opening 36 of the first insert element 21.

Figure 7:
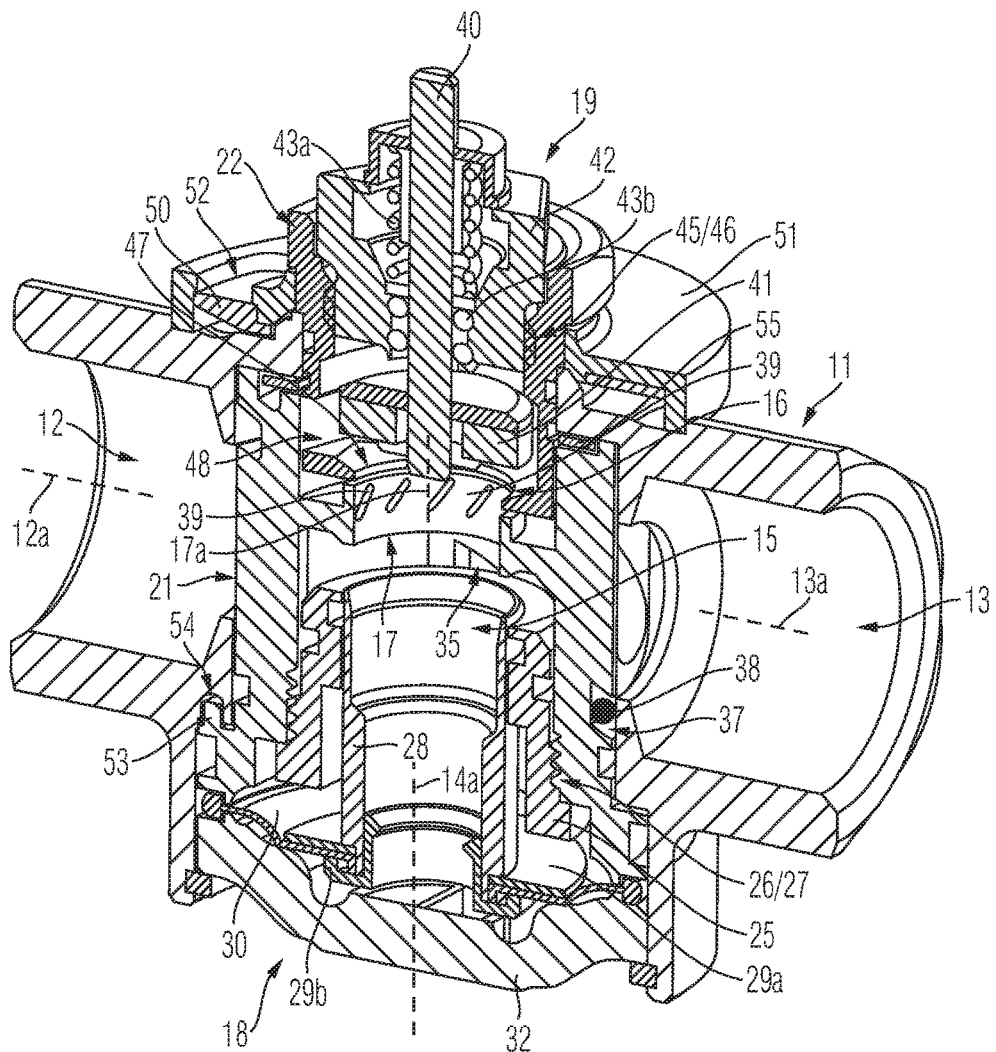
FIG. 7 shows a perspective cross sectional view through the pressure independent control valve.
Figure 9:
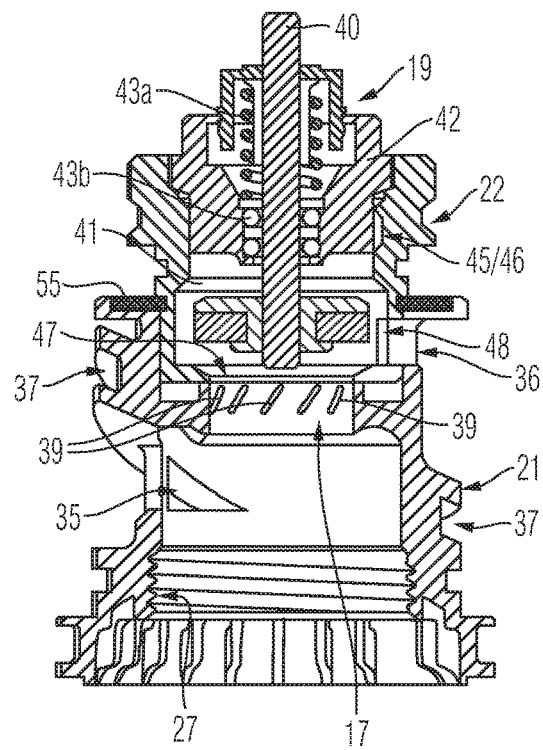
FIG. 9 shows a cross section through the assembly of FIG. 8.

In an assembled status of the pressure independent control valve 10, the axial relative position of the two insert elements 21 and 22 is fixed by an element 55 like a lock ring or a snap ring or a Seeger-ring. Said element 55 is shown in FIGS. 7, 9 and enters into recesses within the two insert elements 21 and 22. Said element 55 fixes only the axial relative position of the two insert elements 21 and 22. However, said element 55 allows the rotation of the second insert element 22 relative to the first insert element 21 around the longitudinal axis 22a of the second insert element 22.

By rotating the second insert element 22 relative to the first insert element 21 the overlap of the outlet opening 48 of the second insert element 22 with the or each outlet opening 36 of the first insert element 21 can be adjusted. Said overlap defines an effective outlet opening of the two insert elements 21, 22 and presets the maximum flow rate through the pressure independent control valve 10. As mentioned above, the position of the first insert element 21 is fixed by the pin 53 of the first insert element 21 entering into the recess 54 of the valve body 11.

The second insert element 22 can be rotated relative to the first insert element 21 by the operating a handle 51. When rotating the handle 51, the second insert element 22 together with the adjustment device 19 becomes rotated relative to the valve body 11 and relative to the first insert element 21.

As mentioned above, the second insert element 22 becomes rotated relative to the first insert element 21 to preset the maximum flow rate through the pressure independent control valve 10. An indicator disc 50 is fixed to the valve body 11. So, when the handle 51 becomes rotated to change the presetting of the maximum flow rate through the pressure independent control valve 10, the second insert element 22 is rotated relative to the first insert element 21 and further the handle 51 is rotated relative to the indicator disc 50. The handle 51 has an opening 52 at a defined position. The indicator disc 50 is visible though said opening 52 in the handle 51. The indicator disc 50 carries a scale indicating the presetting of the maximum flow rate. Said scale is partially visible through the opening 52 in the handle 51 depending from the relative position of the opening 52 of the handle 51 relative to the indicator disc 50.

Figure 2:
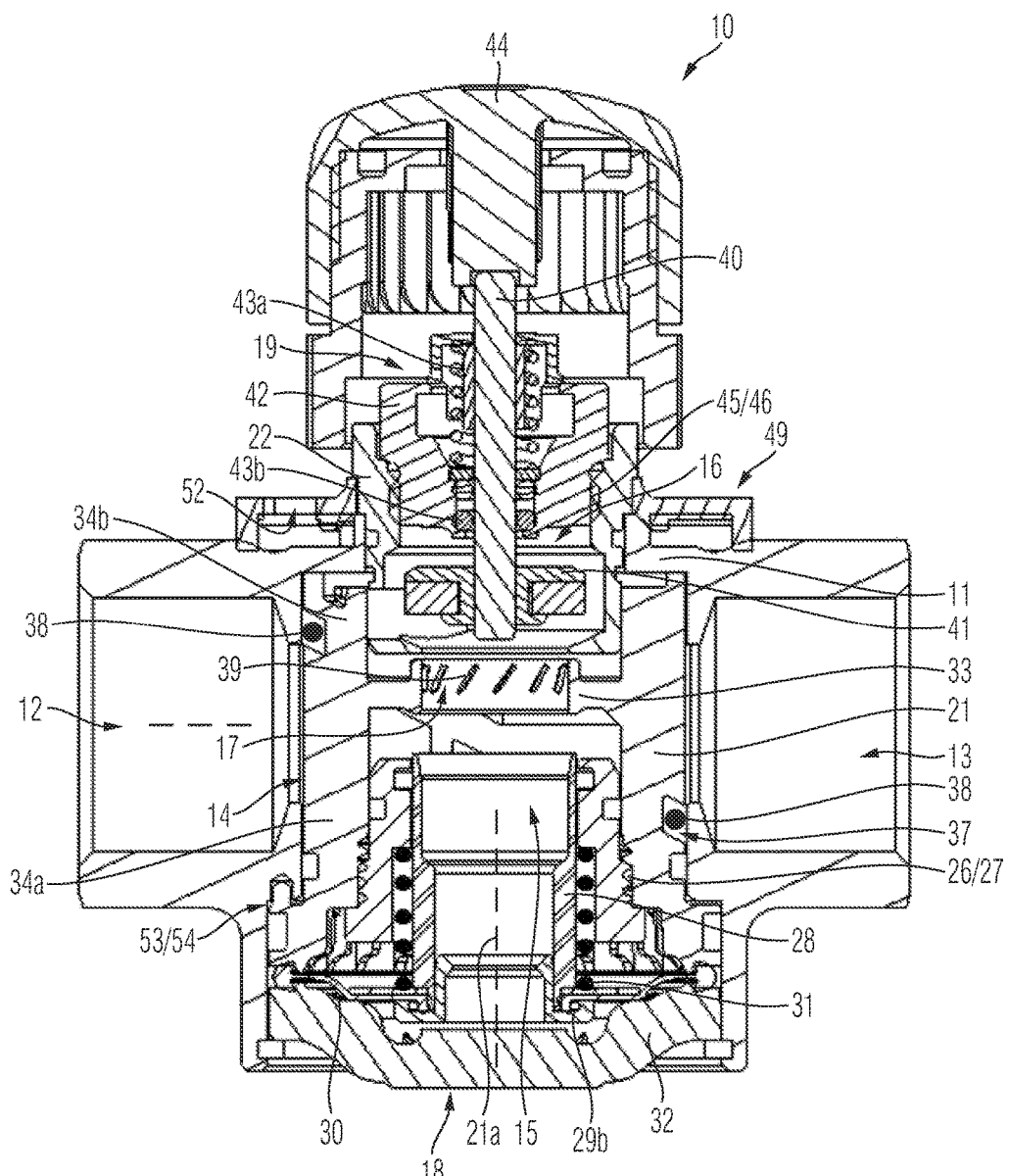
FIG. 2 shows a cross section through the pressure independent control valve.
Figure 3:
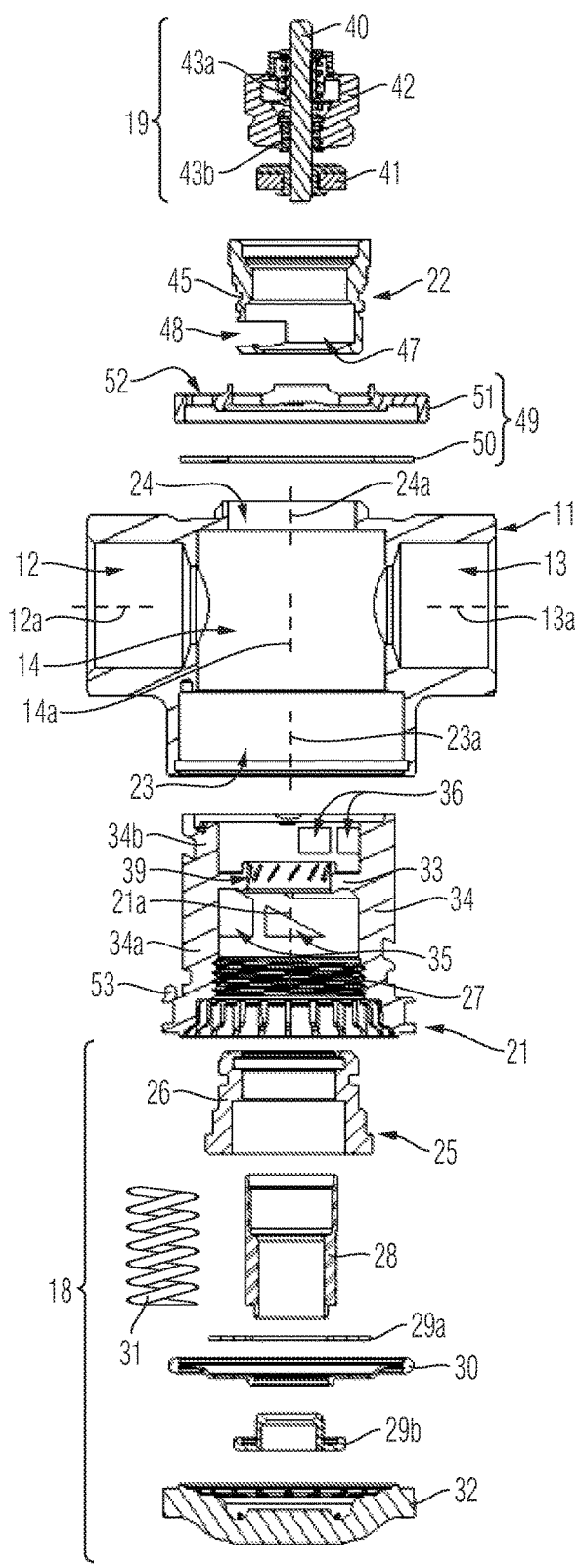
FIG. 3 shows an exploded view of FIG. 1.
Figure 4:
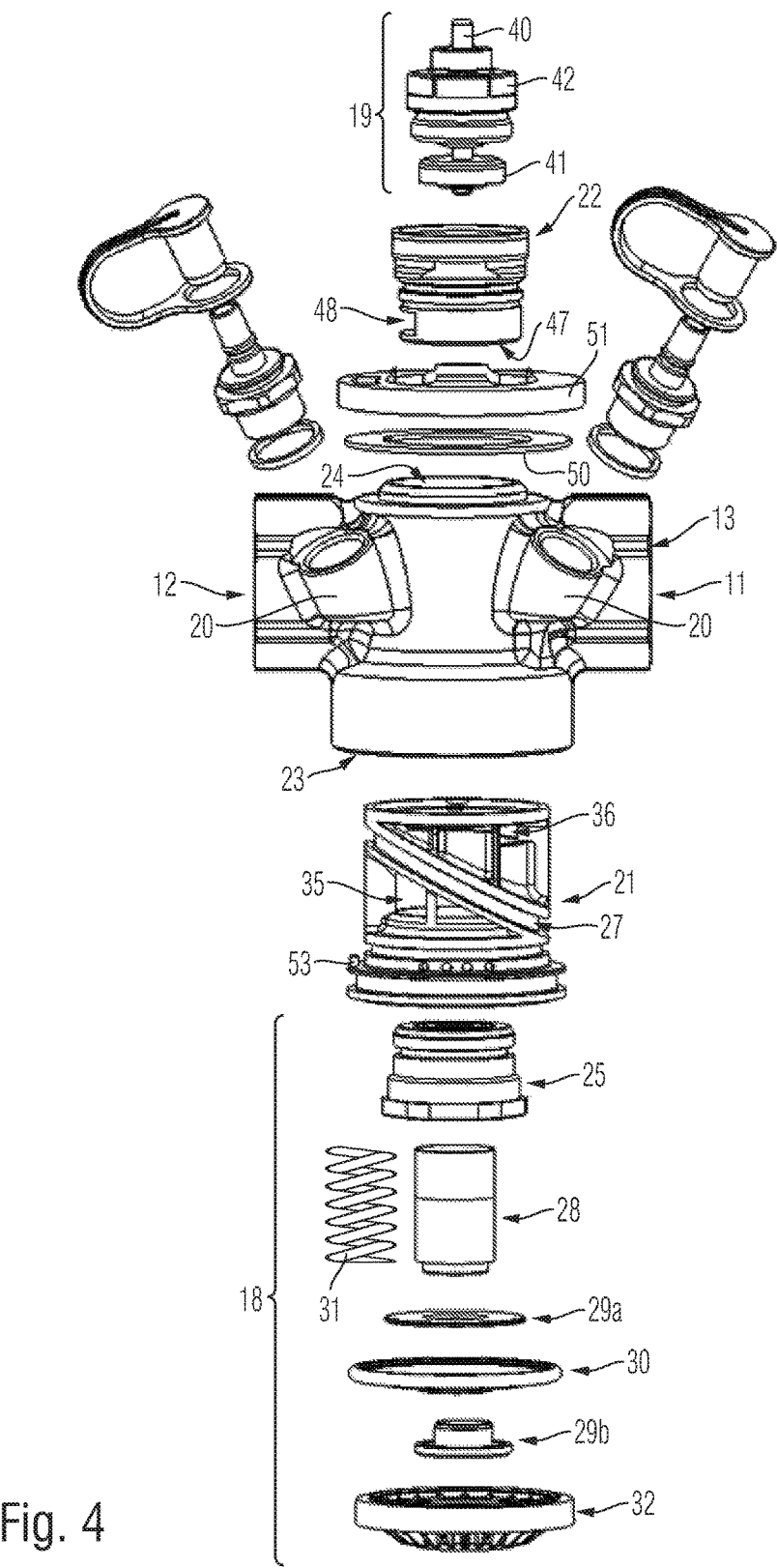
FIG. 4 shows an exploded view of FIG. 2.
Figure 5:
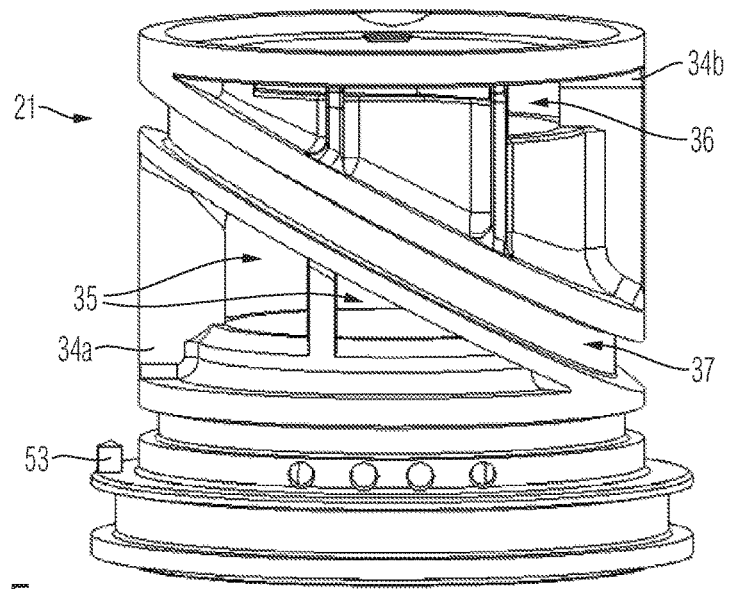
FIG. 5 shows a detail of FIG. 4.
Figure 6:
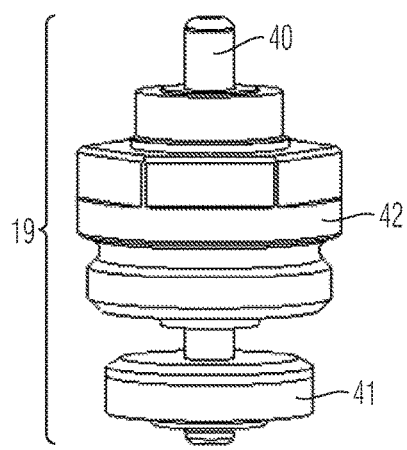
FIG. 6 shows another detail of FIG. 4.
Figure 6:
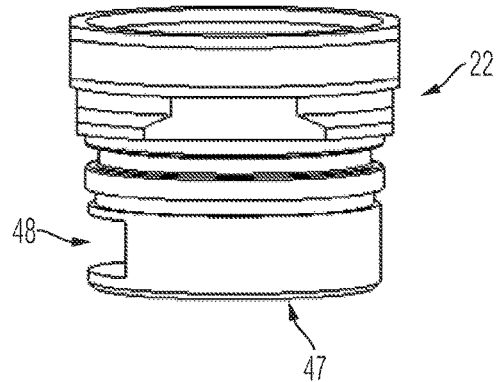

FIGS. 1 and 2 show further a hand wheel 44. The hand wheel 44 can be used for manually changing the position of the valve plunger 41 of the adjustment device 19. Said hand wheel 44 can e.g. be used to close the pressure independent control valve 10. Usually, said hand wheel 44 is replaced by an actuator (not shown). Such an actuator can change the position of the valve plunger 41 and can be used to adjust the flow rate through the pressure independent control valve 10 between the preset maximum flow rate and zero.

LIST OF REFERENCE SIGNS 10 pressure independent control valve
11 valve body
12 inlet section
12a axis
13 outlet section
13a axis
14 middle section
14a axis
15 upstream chamber
16 downstream chamber
17 adjustment orifice
17a axis
18 first functional group/control device
19 second functional group/adjustment device
20 check section
21 first insert element
21a axis
22 second insert element
22a axis
23 first opening
23a axis
24 second opening
24a axis
25 housing
26 outer thread
27 inner thread
28 mobile element
29a disk-like element
29b disk-like element
30 diaphragm
31 spring element
32 cover
33 inner wall section
34 outer wall section
34a sub-section
34b sub-section
35 inlet opening
36 outlet opening
37 groove
38 sealing element
39 rib
40 valve stem
41 valve plunger
42 guiding element
43a spring element
34b spring element
44 hand wheel
45 outer thread
46 inner thread
47 inlet opening
48 outlet opening
49 indicator
50 indicator disc
51 handle
52 opening
53 pin
54 recess
55 element

What is claimed is:

1. A pressure independent control valve for controlling the flow of a liquid medium, comprising:
a valve body including:
an inlet section in which an inlet pressure of the liquid medium is present,
an outlet section in which an outlet pressure of the liquid medium is present, wherein the outlet section is coaxial with the inlet section; and
a middle section positioned between the inlet section and the outlet section, wherein an upstream chamber and a downstream chamber being in communication with each other through an adjustment orifice are provided within the middle section;
a first functional group defined by a control device for controlling a differential pressure within the pressure independent control valve;
a second functional group defined by an adjustment device suitable for increasing and/or decreasing the liquid flow rate through the adjustment orifice;
a first insert element providing the adjustment orifice at least partially positioned within the middle section of the valve body, wherein the first insert element is placed within the middle section of the valve body through a first opening of the valve body provided at a first side of the middle section, wherein the control device is at least partially accommodated with the first insert element, wherein an inner wall section of the first insert element that provides the adjustment orifice comprises ribs, wherein the ribs are inclined relative to a longitudinal axis of the adjustment orifice, and wherein an axis of each of the ribs and the longitudinal axis of the adjustment orifice define an angle between 5° and 60°; and
a second insert element is at least partially positioned within the middle section of the valve body, wherein the second insert element is placed within the middle section of the valve body through a second opening of the valve body provided at a second, opposite side of the middle section, and wherein the adjustment device providing the second functional group is at least partially accommodated with the second insert element.

2. The pressure independent control valve of claim 1, wherein the first insert element is coaxial with the second insert element, the first opening of the valve body is coaxial with the second opening of the valve body, and the first functional group is coaxial with the second functional group.

3. The pressure independent control valve of claim 1, wherein a longitudinal axis of the first insert element, a longitudinal axis of the second insert element, a longitudinal axis of the first opening of the valve body and a longitudinal axis of the second opening of the valve body run perpendicular to a longitudinal axis of the inlet section of the valve body and a longitudinal axis of the outlet section of the valve body.

4. The pressure independent control valve of claim 1, wherein the longitudinal axis of the adjustment orifice runs perpendicular to a longitudinal axis of the inlet section and the outlet section of the valve body.

5. The pressure independent control valve of claim 1, wherein an outer wall section of the first insert element comprises at least one inlet opening through which the inlet section of the valve body communicates with the upstream chamber of the middle section.

6. The pressure independent control valve of claim 5, wherein the outer wall section of the first insert element comprises multiple inlet openings each being in communication with the inlet section.

7. The pressure independent control valve of claim 1, wherein an outer wall section of the first insert element comprises at least one outlet opening through which the downstream chamber of the middle section communicates with the outlet section of the valve body.

8. The pressure independent control valve of claim 1, wherein the adjustment device providing the second functional group is provided by a thermostatic radiator valve insert.

9. The pressure independent control valve of claim 1, wherein the second insert element provides an inlet opening being in communication with the adjustment orifice, and the second insert element provides an outlet opening being in communication with an outlet opening of the first insert element, wherein the relative position of the outlet opening of the second insert element relative to the outlet opening of the first insert element defines a maximum flow through the pressure independent control valve.

10. The pressure independent control valve of claim 1, wherein the first and second insert elements are both monolithic.

11. The pressure independent control valve of claim 1, wherein the angle defined by the axis of each of the ribs and the longitudinal axis of the adjustment orifice is between 15° and 40°.

12. The pressure independent control valve of claim 1, wherein the first functional group is configured to control the differential pressure between the inlet pressure within the upstream chamber and the outlet pressure within the outlet section.

13. The pressure independent control valve of claim 1, wherein the angle defined by the axis of each of the ribs and the longitudinal axis of the adjustment orifice is between 10° and 50°.

14. The pressure independent control valve of claim 1, wherein an outer wall section of the first insert element provides a groove accommodating a sealing element, and wherein the groove runs diagonally around the outer wall section with respect to a longitudinal axis of the first insert element so that the sealing element accommodated within the groove seals an upstream chamber against a downstream chamber.

15. A pressure independent control valve for controlling the flow of a liquid medium, comprising:
a valve body having a side wall defining a conduit that extends from an inlet to an outlet of the pressure independent control valve, the side wall including a first side opening and a second side opening extending through the side wall and into the conduit;
a control device for controlling a differential pressure across the pressure independent control valve;
an adjustment device suitable for adjusting the liquid flow rate through the pressure independent control valve;
a first insert element placed at least partially through the first side opening of the valve body, wherein at least part of the control device is accommodated by the first insert element, wherein an outer wall section of the first insert element provides a groove accommodating a sealing element, wherein the groove runs diagonally around the outer wall section with respect to a longitudinal axis of the first insert element so that the sealing element accommodated within the groove seals an upstream chamber against a downstream chamber, wherein an inner wall section of the first insert element provides an adjustment orifice comprising ribs, wherein the ribs are inclined relative to a longitudinal axis of the adjustment orifice, and wherein an axis of each of the ribs and the longitudinal axis of the adjustment orifice define an angle between 5° and 60°; and
a second insert element placed at least partially through the second side opening of the valve body, wherein at least part of the adjustment device is accommodated by the second insert element.

16. The pressure independent control valve of claim 15, wherein an axis of each of the ribs and the longitudinal axis of the adjustment orifice define an angle between 10° and 50°.

17. The pressure independent control valve of claim 15, wherein an axis of each of the ribs and the longitudinal axis of the adjustment orifice define an angle between 15° and 40°.

18. The pressure independent control valve of claim 15, wherein the longitudinal axis of the first insert element, a longitudinal axis of the second insert element, a longitudinal axis of the first opening of the valve body and a longitudinal axis of the second opening of the valve body run perpendicular to a longitudinal axis of an inlet section of the valve body and a longitudinal axis of an outlet section of the valve body.

19. The pressure independent control valve of claim 15, wherein the longitudinal axis of the adjustment orifice runs perpendicular to a longitudinal axis of an inlet section and an outlet section of the valve body.

* * * * *